United States Patent
Scofield

(10) Patent No.: US 9,792,299 B1
(45) Date of Patent: Oct. 17, 2017

(54) METHOD AND APPARATUS FOR ENABLING A FIRST DEVICE TO CONTROL OPERATION OF A SECOND DEVICE BASED ON A FILE SYSTEM ASSOCIATED WITH THE SECOND DEVICE

(71) Applicant: MARVELL INTERNATIONAL LTD., Hamilton (BM)

(72) Inventor: Daniel Scofield, Meridian, ID (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 1070 days.

(21) Appl. No.: 14/026,099

(22) Filed: Sep. 13, 2013

Related U.S. Application Data

(60) Provisional application No. 61/702,479, filed on Sep. 18, 2012.

(51) Int. Cl.
   G06F 17/00 (2006.01)
   G06F 17/30 (2006.01)

(52) U.S. Cl.
   CPC .............................. *G06F 17/30221* (2013.01)

(58) Field of Classification Search
   CPC .... G06F 9/4411; G06F 3/1204; G06F 9/4415; G06F 3/0486; G06F 3/1208; G06F 3/1207; G06F 9/30145; G06F 9/3802; G06F 9/30047; G06F 12/0862; G06F 12/0875

See application file for complete search history.

(56) References Cited

U.S. PATENT DOCUMENTS

| | | | |
|---|---|---|---|
| 2006/0123044 A1* | 6/2006 | Minami | G03G 15/5066 |
| 2007/0100816 A1* | 5/2007 | Muroi | G06F 17/30011 |
| 2007/0198995 A1* | 8/2007 | Dellacona | G06F 9/4415 719/321 |
| 2008/0239383 A1* | 10/2008 | Okajima | G06F 3/1207 358/1.15 |
| 2008/0239387 A1* | 10/2008 | Otsuka | G06F 3/1204 358/1.15 |

* cited by examiner

*Primary Examiner* — Truong Vo

(57) ABSTRACT

Systems, methods, and other embodiments associated with controlling a device to perform functions using features of a native file system are described. According to one embodiment, a method includes in response to receiving a request to a file system in a first device from a second device, decoding a file path in the request to determine a function of the first device that correlates with the file path. The file system is defined to include a hierarchy of folders that correlate with functions performable by the first device. The method includes causing the first device to perform the function associated with the file path decoded from the request.

20 Claims, 4 Drawing Sheets

METHOD AND APPARATUS FOR ENABLING A FIRST DEVICE TO CONTROL OPERATION OF A SECOND DEVICE BASED ON A FILE SYSTEM ASSOCIATED WITH THE SECOND DEVICE

CROSS REFERENCE TO RELATED APPLICATIONS

This patent disclosure claims the benefit of U.S. Provisional Application No. 61/702,479 filed on Sep. 18, 2012, which is incorporated herein by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

By using a personal computer (or other computing device), a user can interact with many different devices (e.g., printers, faxes, scanners, cameras, and so on) that are in communication with the personal computer. Each of the different devices typically requires the user to configure their personal computer by selecting settings and installing drivers and/or custom software. Additionally, once installed and configured, a user must then remember how to interact with and use each of the different devices. Accordingly, installing drivers/software and remembering how to use the different devices can be a difficult task for users.

SUMMARY

In general, in one aspect this specification discloses a first device. The first device includes a file system having a hierarchy of folders that respectively correlate with a plurality of functions performable by the first device. The first device includes a decode logic configured to receive, from a second device, a request having a file path that specifies one or more folders of the hierarchy of folders in the file system. The decode logic is configured to, in response to receiving the request, determine one or more functions of the plurality of functions that correlates with the one or more folders specified by the file path. The device includes a control logic configured to cause the first device to perform the one or more functions determined to correlate with the one or more folders specified by the file path.

In general, in another aspect, this specification discloses a method. The method includes, in response to receiving a request to a file system in a first device from a second device, decoding a file path in the request to determine a function of the first device that correlates with the file path. The file system is defined to include a hierarchy of folders that correlate with functions performable by the first device. The method includes causing the first device to perform the function associated with the file path decoded from the request.

In general, in another aspect, this specification discloses a non-transitory computer-readable medium storing computer executable instructions that when executed by a computer cause the computer to perform a method. The method includes receiving, in a first device, a request from a second device to a file system of the first device. The first device defines the file system to include folders that correlate with functions performed by the first device. The method includes performing, by the first device, a function associated with a file path from the request that correlates with a folder in the file system.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with providing controls for a device by adapting features of a file system that is native to the device—such a file system is referred to herein as a "native file system". Consider that installing drivers and/or custom software on a computer so that the computer can control a device (e.g., a multifunction printer) is a complex task especially for less sophisticated users. Further consider that different drivers/custom software must be created for each different type of computer (e.g., PC, mobile, and so on) that is to control a device. Accordingly, creating drivers/custom software for each type of computer to make the device cross-platform compatible adds to the complexity of implementing controls for a device.

Therefore, in one embodiment, systems and methods are disclosed that permit controlling functions of the device without requiring installation of drivers or custom software on a computer that is to control the device. That is, the device exploits existing protocols (i.e., native file system protocols) that are already present in the computer by adapting the protocols to provide an interface for controlling the device. In one embodiment, the device defines a file system that includes folders and files that correlate with functions of the device. The file system of the device builds on and uses file system protocols common (i.e., native) to the computer and the device so that the computer can interact with the file system without requiring a user to install additional drivers/custom software to control the device. Accordingly, a user can initiate the device functions by using techniques implemented from the file system protocol.

In one implementation, the file system protocol is native to the device and the computer. That is, the file system protocol is native/common to the device and the computer, and is not installed for purposes of providing controls of the device to the computer. Instead, the file system protocol is manipulated by the device and used as a mechanism for causing commands to be communicated from the computer to the device. As will be described below, a user can initiate device functions by navigating the folders of the file system and, dragging and dropping files. The drag-and-drop operation initiates a device function that is assigned to a file path associated with the file being dropped. In this way, the user browses and interacts with the folders and files in the file system of the device to control the functions of the device without using separate drivers or custom software to control the device.

Figure 1:
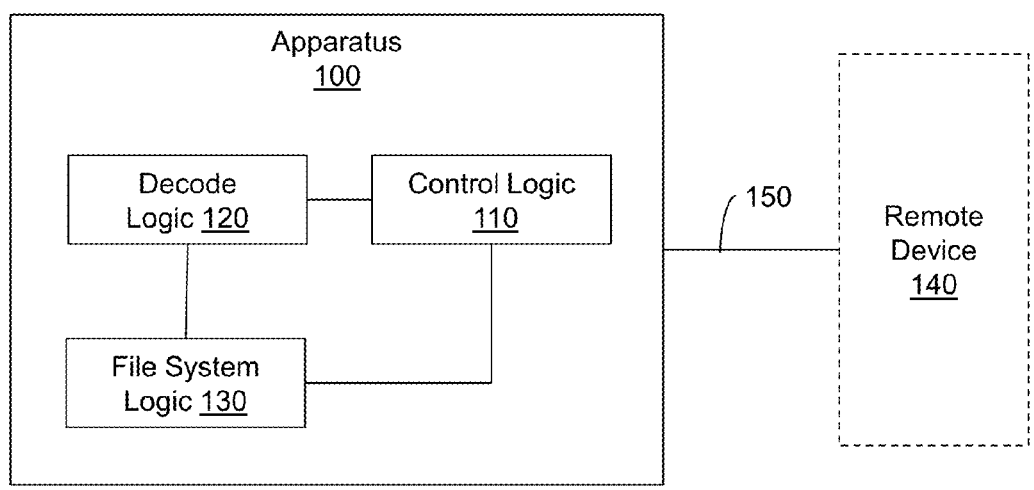
FIG. 1 illustrates one embodiment of an apparatus including a file system.

With reference to FIG. 1, one embodiment of an apparatus 100 is shown that is associated with using a file system protocol that is adapted to communicate commands for controlling the apparatus 100. In one embodiment, the apparatus 100 includes a control logic 110, a decode logic 120, and a file system logic 130. The apparatus 100 can be, for example, one or more of a multi-function printer, a scanner, a fax, a printer, a computer, a tablet computer, a camera, a video camera, a microphone, and so on. In general, the apparatus 100 is any device that includes at least electronics and memory, and can be controlled by another device (e.g., remote device 140) to perform one or more functions. The functions may include, for example, scanning, copying, faxing, photographing, videoing, recording sound, and more generally any function for which the apparatus 100 has associated hardware to perform such functions. In one implementation, the functions performable by the apparatus 100 are not, in general, capable of being performed by the remote device 140. However, in some embodiments, the remote device 140 is capable of performing the functions but still uses the apparatus 100 to perform the functions.

The remote device 140 is a device that communicates with the apparatus 100 to control the apparatus 100. The remote device 140 can be, for example, one or more of a personal computer, a smartphone, a tablet computer, and so on. In one embodiment, a user controls the remote device 140 to perform various productivity functions (e.g., word processing), browse and view files, play games, and so on. The remote device 140 may print/scan/fax using another device (e.g., the apparatus 100) since hardware for performing these functions is typically not included as part of the remote device 140. Additionally, the remote device 140 communicates with the apparatus 100 via a communication channel 150. The communication channel 150 can be, for example, a wireless communication channel (e.g., Wi-Fi, Bluetooth®, etc.) or a wired communication channel (e.g., USB, Ethernet, etc.). In either case, the remote device 140 uses the communication channel 150 to communicate with the apparatus 100 to control the apparatus 100 to perform various functions by using the file system protocol.

In one embodiment, the file system logic 130 is configured to define a file system including a hierarchy of folders and files. The file system, in general, defines how data is stored within a storage medium and provides access to the data. For example, the file system operates according to a file system protocol to store a data structure that uses a hierarchy of folders to organize storage and retrieval of data in a computing system. In one embodiment, the hierarchy of folders and files are defined to operate as an interface to control specified functions within the apparatus 100. File paths are created by a sequence of folders and files in the hierarchy where a file path is assigned to correlate with a specified function that can be performed by the apparatus 100. The file system is structured and operates (e.g., defines, organizes, shares, etc.) according to the file system protocol. In general, the file system protocol defines how the file system operates.

For example, the file system logic 130 respectively assigns names to the primary folders according to available functions (e.g., print, scan, fax), and further respectively assigns names to each subfolders/files within each primary folder according to available options for the functions associated with the primary folder (e.g., scan quality, print orientation, etc.). However, (in one embodiment) the folders and files are not actual folders and files but are instead virtual folders and files that act as controls to permit other devices (e.g., the remote device 140) to control the apparatus 100. That is, in such an embodiment, the folders and files of the file system do not organize and store data as does a typical file system. Instead, the file system of the apparatus 100 is a mechanism for manipulating the file system protocol to communicate commands for controlling the apparatus 100. Accordingly, a user of the remote device 140 can control the apparatus 100 and initiate functions by interacting with the folders and files (e.g., dragging and dropping files to or from folders of the file system) using the file system protocol that is common/native to the apparatus 100 and the remote device 140. While dragging and dropping files to or from the file system is generally discussed, of course, in other embodiments, interaction with the file system to cause the apparatus 100 to perform the functions may occur via a command line, from within a separate application on the remote device, and so on.

In one embodiment, the file system logic 130 generates a folder for each of the functions of the apparatus 100. That is, if the apparatus 100 supports a scan function, a fax function, and a print function, then the file system logic 130 generates a folder for the scan function, a folder for the fax function, and a folder for the print function. Furthermore, the file system logic 130 is configured to generate folders for each function that the apparatus 100 is capable of performing and which may be controlled by the remote device 140. The file system logic 130 also generates subfolders within the folders for different options of the functions. For example, if the print function has options for (i.) double sided printing, (ii.) folding, and (iii.) color printing, then the file system logic 130 generates subfolders in the print folder that correlate with each option or sub-function associated with printing using the apparatus 100.

In another embodiment, the file system logic 130 generates a single folder for a plurality of functions of the apparatus 100 and/or generates a single subfolder that is representative of a plurality of options of a corresponding function. In such an embodiment, a particular function or a particular option can be selected based on a swiping motion of a user towards the particular function/option as displayed within the single folder/subfolder on a user interface of the apparatus 100. The file system logic 130 may also generate additional folders within the subfolders that correlate with additional options. As an example, consider that color printing may include additional options for a quality of the prints, thus, the color printing folder may include additional folders that correlate with different quality options (e.g., print\color printing\quality\).

Additionally, in one embodiment, the file system logic 130 is configured to generate one or more files in a folder for each function depending on a type of the function. In one embodiment, if a function is a print, fax, or other function that uses a file as an input, then the file system logic 130 does not generate a file in the folder. Instead, the folders will accept files as input for the function upon a drag and drop operation into the folder from, for example, the remote device 140. In contrast, if the function is a scan, record, or other function that provides a file as an output, then the file system logic 130 generates a file in a folder that correlates with the function when defining the file system. In this way, the file acts as the control for the function and the control logic 110 causes the apparatus 100 to perform the function when the file is dragged from the folder to, for example, the remote device 140.

To further understand how drag and drop operations to and from a folder hierarchy of the apparatus 100 cause the apparatus 100 to perform functions, consider that the drag and drop operations occur according to the file system protocol that is common to the remote device 140 and the apparatus 100. In some embodiments, the file system protocol can be, for example, the Common Internet File System (CIFS), the Server Message Block (SMB) protocol, a set of file system protocols for defining and sharing files and folders, or a similar protocol. Accordingly, the file system logic 130 is configured to define and share the file system of the apparatus 100 using the file system protocol. The file system logic 130 generates the folders and files that correlate with the functions of the apparatus 100 in a folder hierarchy. The folders and files of the file system are virtual in that the files and folders do not store or organize actual data—such folders and files are also referred to herein as virtual folders and virtual files. However, the virtual folders and virtual files appear as standard folders and standard files (that actually store or organize data) according to the file system protocol. The file system logic 130 shares the folder hierarchy over the communication channel 150 with devices communicating on the communication channel (e.g., the remote device 140). The file system logic 130 shares the folder hierarchy according to the file system protocol so that the remote device 140 and any other device communicating on the channel 150 can interpret and interact with the folder hierarchy.

Consequently, the remote device 140 can navigate the folder hierarchy and interact with the folders and files of the folder hierarchy. Furthermore, when a user of the remote device 140 performs a drag and drop of a file into the folder hierarchy or from the folder hierarchy, the remote device 140 generates a request according to the file system protocol. The drag and drop includes, for example, selecting and moving a file between the file system of the apparatus 100 and a file system of a device (e.g., the remote device 140) communicating with the apparatus 100. Depending on whether a function is an output or an input function, the file is either dragged from (for an output function) a folder in the file system of the apparatus 100 or dragged to (for an input function) a folder in the file system of the apparatus 100.

Thus, when a file is dragged from or to the apparatus 100 a request is generated that specifies at least a file path of the file from the drag and drop event. The file path identifies a location in the folder hierarchy of the drag and drop operation (e.g., P:\scan\Color_Photo.jpg). However, because the folders and files in the folder hierarchy are virtual folders and virtual files that act as controls of the apparatus 100, the request generated by the drag and drop event causes the apparatus 100 to perform a function that correlates with the file path in addition to copying the file to or from the apparatus 100.

That is, the file path in the request is an encoded command that communicates to the apparatus 100 to perform a function. In one embodiment, the file path is encoded as a structured list of folders and subfolders that are defined according to the file system as the file system logic 130 generated the folders and files. Accordingly, the file path defines a function and options for the function as an inherent characteristic of how the file system logic 130 originally defined the file system. That is, the file path correlates with the functions of the apparatus 100 (e.g., \print\color printing\quality\600 dpi\). In this way, the file system protocol is used to convey commands to the apparatus 100 using requests generated by the drag and drop operations. Accordingly, the apparatus 100 exploits properties of the files system protocol to provide controls to the remote device 140 without installing drivers/custom software on the remote device 140.

Furthermore, the file system protocol operates without modification but because of the way in which the file system logic 130 defined the file system, the apparatus 100 causes the file system protocol to unknowingly convey the encoded commands using the file paths of requests from the remote device 140 to the apparatus 100. In one embodiment, the decode logic 120 is configured to receive the requests and decode the file paths from the requests to determine a corresponding function. For example, upon receiving a request generated in response to a drag and drop event the decode logic 120 is configured to parse the request into parts to determine each folder and file that is part of the file path. Each folder and file is defined by the file system logic 130 to identify a function or option within a function. Accordingly, the file path of a request reflects the function and options of the function that are the subject of the drag and drop.

In one embodiment, the file path includes variables for performing the function. For example, a first folder in the file path may denote a base function (e.g., fax). A second folder in the file path may denote a first variable/option (e.g., retry every 30 seconds) while a third folder denotes a second variable/option (e.g., fax number). Accordingly, a format of the file path may be determined from a lookup. That is, a lookup is performed and a rule or guide for interpreting the file path is determined so that the decode logic 120 can determine the function and which folders in the file path correlate with which options.

Additionally, in another embodiment, the decode logic 120 uses the full file path or component portions of the file path to perform a lookup instead of retrieving a format for the file path. That is, the decode logic 120 uses the file path as an input to a lookup table, list, or other data structure to determine a function and/or options for the function that correlate with the entire file path or file path component. For example, the decode logic 120 performs a lookup to determine a predefined command that correlates with the complete file path instead of parsing the file path and individually determining the function and options. In either case, the decode logic 120 decodes the file path to determine the function (and associated options) that correlate with the file path. In this way, the file system protocol is used to convey commands without installing additional drivers or custom software on the remote device 140 and to support commands/functions that are not directly or inherently supported by the file system protocol.

Figure 2:
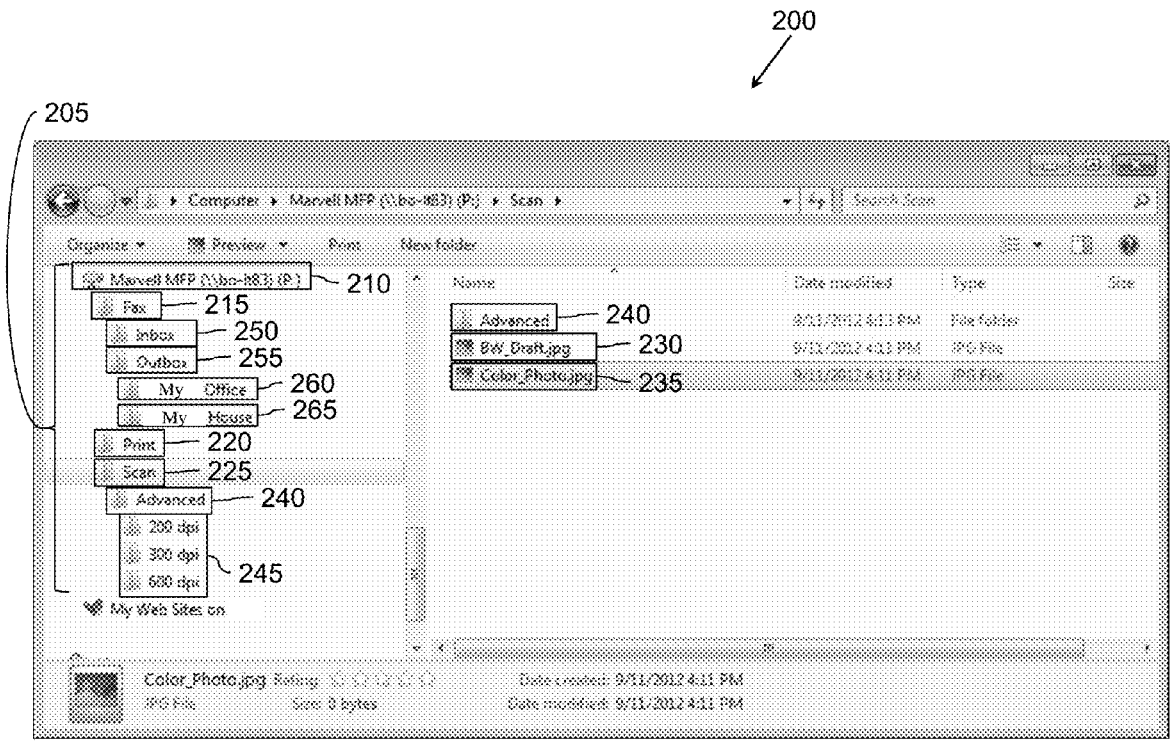
FIG. 2 illustrates one example of a file system associated with controlling an apparatus to perform functions using the file system.

FIG. 2 will now be discussed in tandem with FIG. 1 and the apparatus 100. For the purposes of FIG. 2 the apparatus 100 will be discussed as a multi-function printer that includes hardware that provides scan functions, print functions, fax functions, and so on. FIG. 2 illustrates an example window 200 displaying a file system of the apparatus 100 as viewed from the remote device 140. The window 200 includes a folder hierarchy 205 of the file system for the apparatus 100. As discussed, the file system logic 130 generates folders and files in the folder hierarchy 205 to correlate with functions of the apparatus 100.

For example, the folder hierarchy 205 includes a root folder 210 that identifies the apparatus 100 as a device connected to the remote device 140 and as a device that includes folders and files for viewing. In FIG. 2, the root folder 210 includes a fax folder 215, a print folder 220, and a scan folder 225. The folders 215-225 correlate with basic functions that the apparatus 100 is capable of performing. That is, each of the folders 215-225 correlates with a default or unmodified rendition of each of the functions capable of being performed by the apparatus 100. While the folder hierarchy 205 is illustrated with a specific set of folders for functions and options, in other embodiments, the file hierarchy 205 may include a different number of folders and files that correspond to a different set of functions and options.

In general, the apparatus 100 may perform two different types of functions, input functions and output functions. When a function that correlates with a folder is an output function that produces a file as a result of the function occurring, the file system logic 130 generates the folder with a file that operates as an interface for controlling the function. The file is, for example, a virtual file that when dragged from the folder to another device (e.g., the remote device 140) causes the function to occur and may also cause the file to be copied to the device as content of the file is acquired by performing the function.

As an example, the scan folder 225 includes a first file 230 labeled "BW_Draft.jpg" and a second file 235 labeled "Color_Photo.jpg." Each of the files 230 and 235 are virtual files that correspond to the scan function and additionally correspond to different options of the scan function. The files 230-235 are "virtual" files since they contain only header information and no content until the function associated with the file is performed by the apparatus 100. For example, the first file 230 correlates with controlling the apparatus 100 to scan a black and white draft image of an object in scanner hardware of the apparatus 100. Thus, when a user of the remote device 140 drags the first file 230 from the window 200 to the remote device 140, a request is generated and received by the apparatus 100 that results in the control logic 110 causing the apparatus 100 to perform a scan. The apparatus 100 performs the scan using settings that correlate with the file path and that produce a file that is a black and white draft quality image file.

Similarly, when the second file 235 is dragged from the window 200 to the remote device 140, a request is received by the apparatus 100 that results in the control logic 110 causing the apparatus 100 to use settings that produce a file that is a color image file. Furthermore, the scan folder 225 also includes an advanced folder 240. The advanced folder 240 includes additional subfolders 245. The additional subfolders 245 provide additional virtual files that permit controlling the apparatus 100 to scan documents at 200 dpi, 300 dpi, and 600 dpi to produce image files of differing respective resolutions.

Other folders are illustrated in the window 200 in a collapsed view. For example, the print folder 220 is illustrated in a collapsed view but may include additional folders for options such as different printing formats and styles (e.g., landscape, folding, double sided, etc.). Because the print function is a function that uses files as input, the print folder 220 and subfolders do not include files but instead accept files from drag and drop operations to the print folder 220 and subfolders. That is, when a file is dropped into the print folder 220 or a sub-folder of the print folder 220, the control logic 110 causes the apparatus 100 to print the file according to options related to that particular file path.

Consider that a user of the remote device 140 desires to print a document using the apparatus 100. Accordingly, the user drags and drops the document into the print folder 220. In response to the drag and drop, the decode logic 120 receives a request that includes a file path (e.g., P:\Print\Document.doc). In one embodiment, along with the request the file is copied to the apparatus 100. The decode logic 120 decodes the file path and determines that the document is to be printed. Accordingly, the control logic 110 provides the document to a printer portion of the apparatus 100 and the apparatus 100 prints the document.

Further consider that instead of dropping the document on the print folder 220, the user wants to fax the document. The fax folder 215 includes an inbox folder 250 and an outbox folder 255. The outbox folder 255 includes a My Office folder 260 and a My House folder 265. While the outbox folder 255 is illustrated with only two destination folders 260-265, in other embodiments, the outbox folder 255 is populated with fax numbers from a contact list, by a user's action through right clicking and adding a folder with a name that is a fax number, and so on. However, in this embodiment, the user has two options for destinations, "My Office" and "My House."

Accordingly, for example, the user drops the document onto the My Office folder 260. In response to the drag and drop event, the document is transferred to the apparatus 100. The document may be transferred as part of a request that is generated in response to the drag and drop event or separate from the request. In either case, the decode logic 120 receives the request which includes a file path associated with the drag and drop event, e.g., P:\Fax\Outbox\My Office\Document.doc. The decode logic 120 is configured to decode the file path to determine the associated function, which is to fax the document to the destination denoted as "My Office." Accordingly, the decode logic 120 determines the function by, for example, performing a lookup in a table. In this example, the lookup may also include retrieving a fax number associated with the "My Office" destination. In another embodiment, the fax number is retrieved by parsing the file path, i.e., the fax number is the name of the folder and thus retrieved when the decode logic 120 parses the file path.

Thus, the decode logic 120 is configured to instruct the control logic 110 of the determined function (i.e., fax) and associated information (i.e., fax number). Consequently, the control logic 110 causes the apparatus 100 to fax the document to the fax number associated with the "My Office" destination. In this way, the apparatus 100 permits other devices (e.g., the remote device 140) to control functions of the apparatus 100 using the file system and without installing drivers or software that are specific to the apparatus 100.

Consider another example in which the user desires to scan a document from the apparatus 100. That is, for example, a document is physically inserted into scan hardware of the apparatus 100 for scanning. Accordingly, the user initiates the scan function by navigating to the scan folder 225 using, for example, the remote device 140. Furthermore, the user drags the first file 230 from the window 200 to the remote device 140. Consequently, a request is generated and received by the decode logic 120. The decode logic 120 proceeds to decode a file path (e.g., P:\scan\BW_Draft.jpg) from the request. As a result of decoding the file path, the decode logic 120 specifies to the control logic 110 to scan the document as a black and white draft quality image file. However, while the decode logic 120 is decoding the file path, the control logic 110 initiates a file transfer to the remote device 140 before content for the first file 230 has been acquired. The control logic 110 is configured to initiate the transfer before the decode logic 120 is finished decoding and the function has even begun because the drag and drop event initiates a copy from the scan folder 225 of the first file 230 to the remote device 140.

Accordingly, to satisfy certain aspects of the copy associated with the file system protocol, the control logic 110 begins to transfer header information about the file 230. That is, the control logic 110 cannot begin to transfer actual content of the file because the content has not yet been acquired from the scan function. Accordingly, the control logic 110 is configured to transfer the header information of the file 230 while the decode logic 120 decodes the file path to determine the function and while the control logic 110 initiates the function as determined by the decode logic 120. Once the apparatus 100 begins the associated function (e.g., scan) and begins to acquire the content of the file 230, the control logic 110 begins to transfer the content until the apparatus 100 has acquired all of the content and the control logic 110 has transferred the content to the remote device 140.

Furthermore, in one embodiment, the control logic 110 throttles a transfer rate of the header information and the content. That is, because the header information is not large, the control logic 110 slowly transfers the header information until the control logic 110 begins to receive the content of the file 230. Once the control logic 110 begins to receive the content of the file 230 from a scan function of the apparatus 100, the control logic 110 throttles up or increases the transfer rate of the file 230 to the remote device. Once the control logic 110 has received all of the content for the file 230, the control logic 110 may transfer the remaining content at a maximum transfer rate until complete. In this way, the control logic 110 is configured to use inherent features of the file system protocol to achieve functions that are not directly supported by the file system protocol (i.e., dynamically transferring a file while acquiring content from a separate function).

Figure 3:
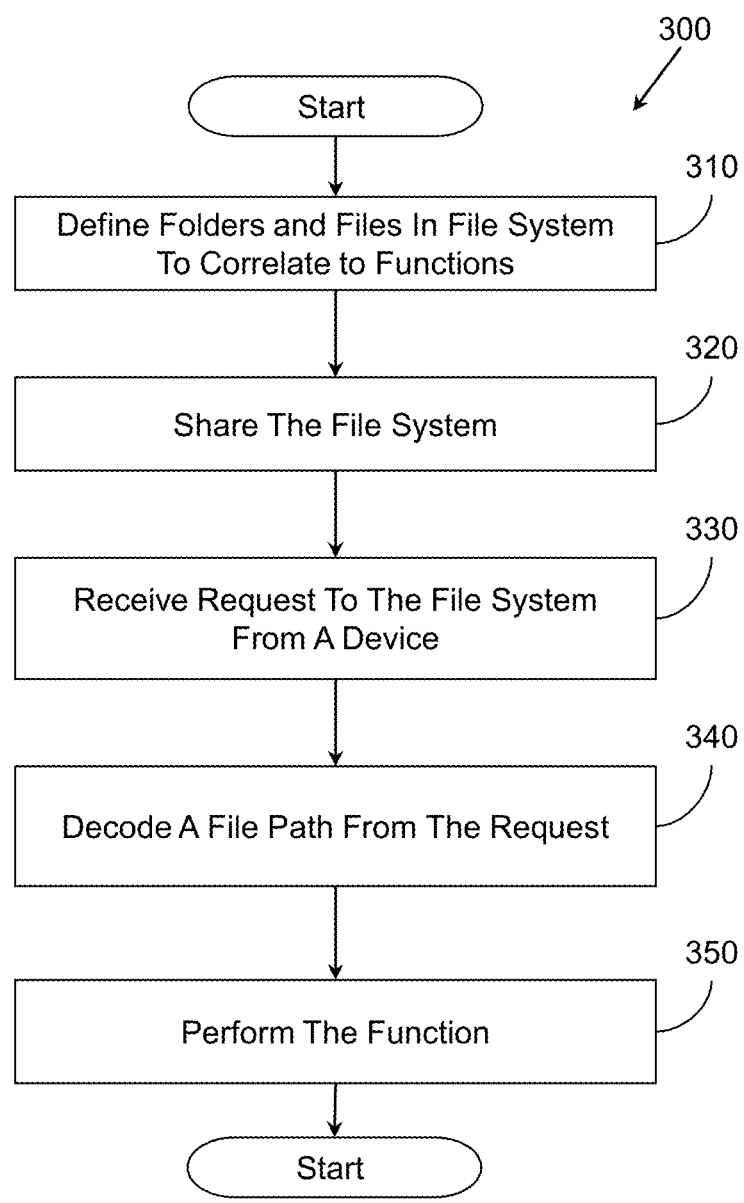
FIG. 3 illustrates one embodiment of a method associated with controlling an apparatus to perform functions using features of a file system.

Further details of controlling a device to perform functions using features of a native file system will be discussed with reference to FIG. 3. FIG. 3 illustrates a method 300 associated with controlling a first device by a second device to perform functions without installing drivers or customer software on the second device. The method 300 will be discussed from the perspective of the apparatus 100 (i.e., the first device) of FIG. 1.

At 310, the apparatus 100 (i.e., the first device) defines folders and files in a file system to correlate with functions performed by the apparatus 100. For example, the apparatus 100 includes hardware that imparts the apparatus 100 with functions (e.g., print, scan, fax, video, etc.) that other devices (e.g., the remote device 140/the second device) are not capable of performing. Additionally, if further functions are added to the apparatus 100 at a later time while operating, the apparatus 100 may dynamically add additional folders and files to the file system to reflect the newly added functions.

Defining the file system by naming the files and folders according to functions/options of the apparatus 100 encodes the file system and thereby individual file paths within the file system with commands for controlling the apparatus 100. However, the commands are passive or not directly functional within the file system protocol since they are, for example, present in the names of the folders and files or entries in a lookup table associated with the file paths. Accordingly, the commands are encoded within the file system and are compatible as folder/file names within the file system protocol under which the file system operates.

However, the file system protocol does not directly support the commands (e.g., the file system protocol is not a printing or scanning protocol). Instead, the apparatus 100 implements the commands by using the file system protocol and the file system as a mechanism to achieve communication of the commands encoded in naming of the file path. The folders and the files are virtual folders and files that are not intended as a file and folder directory structure for storing data, but instead provide commands for controlling the apparatus 100 through the encoded commands of the file paths. In this way, the apparatus 100 uses the file system to permit other devices (e.g., the remote device 140) to control the apparatus 100 using the file system protocol, which is native to the apparatus 100 and the other devices. Therefore, the other devices can control the apparatus 100 without installing additional drivers or custom software.

At 320, after defining the file system, the apparatus 100 shares the file system with one or more devices (e.g., the remote device 140) that are in communication with the apparatus 100. That is, the apparatus 100 makes the file system available according to the file system protocol that is native to and implemented by the apparatus 100 and the one or more devices. The file system protocol is native to the apparatus 100 and the other devices in that, for example, the file system protocol is a protocol that does not need to be specifically installed for the purpose of controlling the apparatus 100 by another device, and is generally available to the devices natively. Accordingly, a user of the one or more devices may navigate the folders and files of the file system by viewing the folders and files in a window and, for example, by clicking on the folders without installing any drivers or software that is specific to the apparatus 100.

At 330, the apparatus 100 receives a request to the file system from a device (e.g., the remote device 140) in communication with the apparatus 100. The request is, for example, a result of a user of the device dragging and dropping a file to or dragging and dropping a file from the file system of the apparatus 100. Accordingly, the drag and drop event generates the request which is received by the apparatus 100. In general, the request includes at least a file path that specifies a file and a location of the file that is the subject of the drag and drop event. The file may only be a partial file if content of the file is, for example, acquired from the function being performed when the file is dragged from the file system of the apparatus 100. By contrast a file dragged to the file system includes data used by the function. In this way, the file system is used to communicate a command to the apparatus 100 via the file path and to communicate data to or from the apparatus 100 using the file.

At 340, upon receiving the request at 330, the apparatus 100 decodes the file path to determine which function to perform. Since each file path is associated with a different function, or different options for a function, the apparatus 100 determines which function to perform and with which options as a function of the file path specified by the request. In this way, the remote device 140 specifies to the apparatus 100 which function to perform using the file system protocol and the file system that has been encoded with commands for controlling the apparatus 100.

Furthermore, while the apparatus 100 is decoding the file path, if the function is an output function that provides a file to the remote device 140, then the apparatus 100 begins to transfer the file while decoding the file path and not necessarily at 350 when content of the file is being acquired by, for example, scanning a document. The apparatus 100 initiates the transfer because content of the file has not yet been acquired but the apparatus 100 still needs to satisfy the remote devices request to transfer or at least begin transferring the file. In this way, the apparatus 100 avoids errors (e.g., timing out) that could occur from waiting to transfer data of the file while the apparatus 100 decodes the file path and acquires content of the file. The apparatus 100 indicates this circumstance by, for example, providing files in the folders for output functions and providing no files in folders for input functions. Accordingly, when a file is dragged from the file system, a transfer of, for example, header information begins immediately in order to avoid errors. However, when a file is dropped to a folder in the file system the transfer may be conducted as normal since content is immediately available to transfer from the remote device 140.

At 350, the apparatus 100 performs a function that correlates with the file path as determined by decoding the file path at 340. In this way, the file system acts as an interface for devices (e.g., the remote device 140) to control the apparatus 100 so that the devices do not need to install or use specific drivers/software that are particular to the apparatus 100 in order to control the apparatus 100. Encoding the file system with commands for controlling the apparatus 100 and using requests generated by the file system to communicate the commands permits the apparatus 100 to be cross-platform compatible and avoid difficulties with drivers and custom software.

Figure 4:
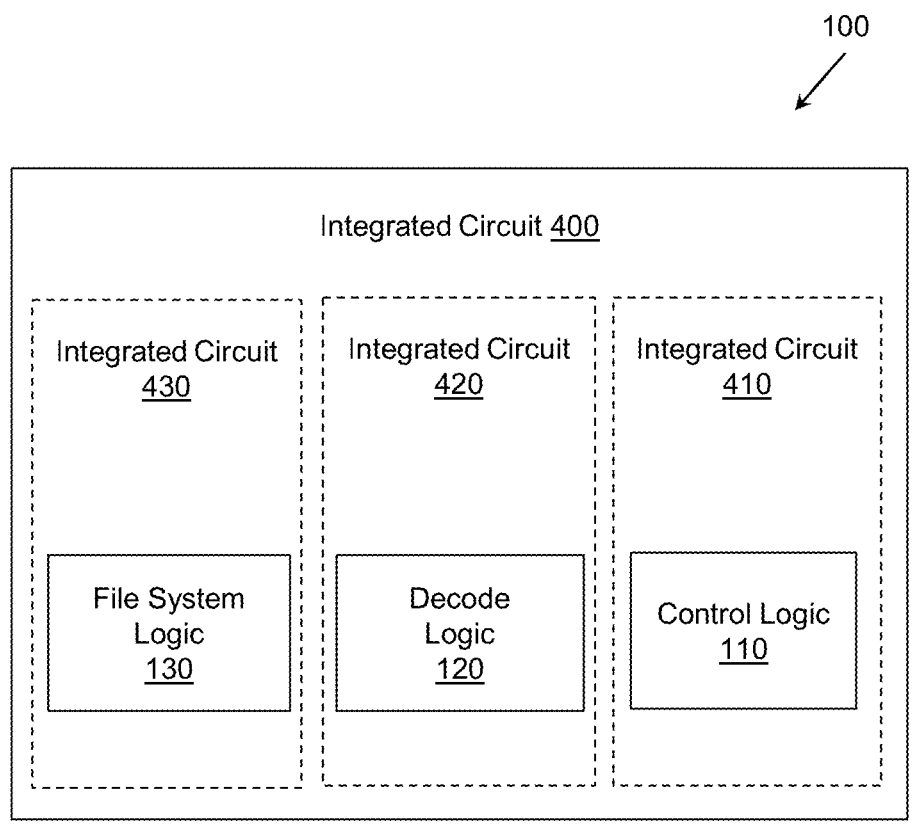
FIG. 4 illustrates one embodiment of an integrated circuit associated with providing controls for the integrated circuit using a file system.

FIG. 4 illustrates an additional embodiment of the apparatus 100 from FIG. 1 that is configured with separate integrated circuits and/or chips. In this embodiment, the control logic 110 from FIG. 1 is embodied as a separate integrated circuit 410. Additionally, the decode logic 120 is embodied on an individual integrated circuit 420. The file system logic 130 is also embodied on an individual integrated circuit 430. The circuits are connected via connection paths to communicate signals. While integrated circuits 410, 420, and 430 are illustrated as separate integrated circuits, they may be integrated into a common integrated circuit board 400. Additionally, integrated circuits 410, 420, and 430 may be combined into fewer integrated circuits or divided into more integrated circuits than illustrated. In another embodiment, the control logic 110, the decode logic 120, and the file system logic 130 (which are illustrated in integrated circuits 410, 420, and 430, respectively) may be combined into a separate application-specific integrated circuit. In other embodiments, portions of the functionality associated with the control logic 110, the decode logic 120 and the file system logic 130 may be embodied as firmware executable by a processor and stored in a non-transitory memory. In some embodiments, the apparatus 100 includes at least a processor and memory, and may also include a communication interface, a display, and/or other electrical components of a computing device.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

What is claimed is:

1. A first device, comprising:
    memory comprising a file system, the file system having a hierarchy of folders that respectively correlate with a plurality of functions performable by the first device;
    a decode logic configured to
        receive, from a second device, a request having a file path that specifies one or more folders, comprising (i) a first folder associated with a base function, (ii) a second folder associated with a first option, and (iii) a third folder associated with a second option, of the hierarchy of folders in the file system, and in response to receiving the request, determine:
(i) the base function that correlates with the first folder specified by the file path,
(ii) the first option that corresponds to the base function and correlates with the second folder specified by the file path, and
(iii) the second option that corresponds to the base function and correlates with the third folder specified by the file path; and
a control logic configured to cause the first device to perform the base function using the first variable and the second variable in accordance with the file path.

2. The first device of claim 1, further comprising:
a file system logic configured to
define the file system by generating the hierarchy of folders that respectively correlate with the plurality of functions performable by the first device, and
share the file system of the first device over a communication channel with the second device to permit the second device to control the first device to perform any of the functions performable by the first device.

3. The first device of claim 1, wherein the file system includes a set of files within the hierarchy of folders that correlate with at least one of one or more functions of the plurality of functions that correlates with the one or more folders, wherein the set of files and the hierarchy of folders are virtual files and virtual folders that operate as an interface for controlling the apparatus to perform the functions using the file system protocol without installing drivers to control the apparatus.

4. The first device of claim 1, wherein the decode logic is configured to determine the function from the file path by performing a lookup in a table, wherein the table stores data that correlates file paths with functions.

5. The first device of claim 1, wherein the request is generated using a file system protocol that is native to the first device and the second device, wherein the function is a function that is not supported by the file system protocol, wherein the file system is a hierarchy that includes the hierarchy of folders and the set of files, and wherein folders within a branch of the hierarchy of folders correlate with different options for a same function.

6. The first device of claim 1, wherein the control logic is configured to cause the first device to perform the function by transferring header information of a file associated with the file path to the second device while causing the first device to perform the function to acquire remaining portions of the file.

7. The first device of claim 1, wherein the first device is a multifunctional printer and the functions are multimedia functions of the multifunctional printer.

8. A method, comprising:
in response to receiving a request to a file system in a first device from a second device, decoding a file path in the request to determine a base function of the first device that correlates with the file path, wherein the file system is defined to include a hierarchy of folders that correlate with functions performable by the first device, wherein the file path specifies one or more folders, comprising (i) a first folder associated with the base function, (ii) a second folder associated with a first option that corresponds to the base function, and (iii) a third folder associated with a second option that corresponds to the base function; and
causing the first device to perform the base function using the first variable and the second variable in accordance with the file path decoded from the request.

9. The method of claim 8, wherein the hierarchy of folders includes a set of files that correlate with at least one of the functions performable by the first device, and wherein the set of files and the hierarchy of folders are virtual files and virtual folders that are controls that cause the first device to perform the functions that correlate with the set of files and the hierarchy of folders.

10. The method of claim 8, further comprising:
sharing the file system of the first device over a communication channel with the second device to permit the second device to control the first device to perform the functions, wherein each folder in the hierarchy of folders in the file system correlate with a different function that the first device is capable of performing.

11. The method of claim 8, wherein the file path in the request indicates an interaction by the second device with a file corresponding with the file path in the file system, wherein the file path correlates with a function of the first device, and wherein the request is received by the first device as a result of the second device interacting with the file system and to control operation of the function by the first device.

12. The method of claim 8, wherein determining the base function from the file path includes performing a lookup, in the first device, in a table that indicates which function correlates with the file path.

13. The method of claim 8, wherein the request is generated using a file system protocol that is native to the first device and the second device, wherein the base function is a function that is not supported by the file system protocol, wherein the file system is a hierarchy that includes the hierarchy of folders, and wherein folders within a branch of the hierarchy of folders correlate with different options for a same function.

14. The method of claim 8, wherein the hierarchy of folders in the file system are an interface for controlling the first device to perform the functions using the file system protocol.

15. The method of claim 8, wherein causing the first device to perform the base function includes transferring header information of a file associated with the file path to the second device while performing the base function in the first device to acquire remaining portions of the file in order to maintain a connection with the second device in an active state until one or more of the remaining portions of the file have been acquired.

16. The method of claim 8, wherein the request is received by the first device upon an interaction with the first device by the second device, and wherein the first device receives the request from the second device over a wired network, a direct connection or a wireless connection.

17. The method of claim 8, wherein the first device is a multifunctional printer and the functions are multimedia functions of the multifunctional printer.

18. A non-transitory computer-readable medium storing computer executable instructions that when executed by a computer cause the computer to perform a method, the method comprising:
receiving, in a first device, a request having a file path from a second device to a file system of the first device, wherein the first device defines the file system to include folders that correlate with functions performed by the first device;
in response to receiving the request, determining:
(i) a base function that correlates with a first folder specified by the file path, (ii) a first option that corresponds to the base function and correlates with a second folder specified by the file path, and
(iii) a second option that corresponds to the base function and correlates with a third folder specified by the file path; and performing, by the first device, the base function using the first variable and the second variable in accordance with the file path.

19. The non-transitory computer-readable medium of claim 18, further comprising:
    decoding, in the first device, the file path in the request to determine a function of the first device that correlates with the file path, wherein the function is performed by the first device.

20. The non-transitory computer-readable medium of claim 18, wherein the folders are virtual folders that are controls that cause the first device to perform the functions that correlate with the folders.

* * * * *